(12) United States Patent
Takashima

(10) Patent No.: US 7,533,151 B2
(45) Date of Patent: May 12, 2009

(54) ELECTRONIC MAIL SENDING DEVICE, INFORMATION PROCESSOR, IMAGE PROCESSING SYSTEM, AND COMPUTER PRODUCT

(75) Inventor: Naoki Takashima, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 791 days.

(21) Appl. No.: 10/927,104

(22) Filed: Aug. 27, 2004

(65) Prior Publication Data

US 2005/0050149 A1    Mar. 3, 2005

(30) Foreign Application Priority Data

Aug. 29, 2003    (JP)    ............................. 2003-306589

(51) Int. Cl.
    *G06F 15/16* (2006.01)
(52) U.S. Cl. ..................... 709/206; 709/204; 358/402
(58) Field of Classification Search ................. 709/206, 709/204
    See application file for complete search history.

(56) References Cited

U.S. PATENT DOCUMENTS

| 5,781,901 | A | 7/1998 | Kuzma |
| 6,751,633 | B2 | 6/2004 | Noguchi |
| 2002/0016818 | A1* | 2/2002 | Kirani et al. ................. 709/203 |
| 2002/0016823 | A1* | 2/2002 | Ueno et al. .................. 709/206 |
| 2002/0124014 | A1 | 9/2002 | Noguchi |
| 2002/0140986 | A1 | 10/2002 | Takayama |
| 2004/0036720 | A1* | 2/2004 | Dworsky ..................... 345/764 |
| 2004/0186894 | A1* | 9/2004 | Jhingan et al. .............. 709/207 |
| 2004/0215696 | A1* | 10/2004 | Fisher et al. ................. 709/201 |

FOREIGN PATENT DOCUMENTS

| JP | 11-136281 | 5/1999 |
| JP | 2002-259307 | 9/2002 |
| JP | 2002-278900 | 9/2002 |
| JP | 2003-134296 | 5/2003 |

* cited by examiner

*Primary Examiner*—William C Vaughn, Jr.
*Assistant Examiner*—Joiya M Cloud
(74) *Attorney, Agent, or Firm*—Oblon, Spivak, McClelland, Maier & Neustadt, P.C.

(57) ABSTRACT

When sending an electronic file to a receiver, the file is first transmitted to a predetermined location. Then, an electronic mail is created and sent to the receiver. This electronic mail contains information that makes it possible for the receiver to download the file from the location. Finally, the electronic mail is sent to the receiver without attaching the file.

4 Claims, 15 Drawing Sheets

| FOLDER | | WORK HISTORY | TRANSFER DATE | TRANSFER END USER |
|---|---|---|---|---|
| MAIN | SUB | | | |
| User01 | Store01 | UPLOAD COMPLETED | 2003.5.13 | kaori@kahna.co.jp |
| User01 | Store02 | UPLOAD COMPLETED | 2003.5.22 | masao@teraki.com |
| User01 | Store03 | UPLOAD COMPLETED | 2003.6.08 | asakawa@mutou.co.jp |
| User01 | Store04 | UPLOAD COMPLETED | 2003.7.16 | misaki@ayakon.co.jp |
| User01 | Store05 | UNUSED | * * * * | * * * * |
| User02 | Store01 | UNUSED | * * * * | * * * * |
| User02 | Store02 | UNUSED | * * * * | * * * * |

FIG.12 index01.htm

User1 FILE TRANSFER UPDATED: JULY 10, 2003

| PAGE | PREPARATION DATE | RETENTION PERIOD | NUMBER OF FILES | VOLUME |
|---|---|---|---|---|
| Store05 | JULY 10, 2003 | JULY 10, 2003 TO JULY 20, 2003 | 5 | 20MB |
| Store06 | UNPREPARED | | | |

FIG.13 index02.htm

Store05 FILE TRANSFER

AN01.TXT

AN03.TXT doc01.TXT doc05.TXT pic02.jpg

FIG.14

```
                                                                    index01.htm
<!DOCTYPE HTML PUBLIC"-//W3C//DTD HTML 4.01 Transitional//EN">
<HTML>
<HEAD>
<META name="GENERATOR" content="IBM WebSphere Homepage Builder V6.0.0 for Windows">
<META http-equiv="Content-Type" content"=text/html; charset=Shift_JIS">
<META http-equiv="Content-Style-Type" content="text/css">
<TITLE></TITLE>
</HEAD>
<BODY>
<P><FONT size="5">U s e r 0 1</FONT>FILE TRANSFER   UPDATED: JULY 10, 2003 <BR>
<BR>
</P>
<TABLE border="1">
    <TBODY>
        <TR>
            <TD>PAGE </TD>
            <TD>PREPARATION DATE</TD>
            <TD>RETENTION PERIOD</TD>
            <TD>NUMBER OF FILES</TD>
            <TD>VOLUME </TD>
        </TR>
        <TR>
            <TD><A href="store05/index02.htm">S t o r e 0 1</A></TD>
            <TD>JULY 10, 2003 </TD>
            <TD>JULY 10, 2003 TO JULY 20, 2003 </TD>
            <TD>5</TD>
            <TD>20MB</TD>
        </TR>
        <TR>
            <TD>S t o r 0 2</TD>
            <TD>UNPREPARED</TD>
            <TD></TD>
            <TD></TD>
            <TD></TD>
        </TR>
    </TBODY>
</TABLE>
```

FIG.15

```
index02.htm

<!DOCTYPE HTML PUBLIC"-//W3C//DTD HTML 4.01 Transitional//EN">
<HTML>
<HEAD>
<META name="GENERATOR" content="IBM WebSphere Homepage Builder V6.0.0 for Windows">
<META http-equiv="Content-Type" content"=text/html; charset=Shift_JIS">
<META http-equiv="Content-Style-Type" content="text/css">
<TITLE></TITLE>
</HEAD>
<BODY>
<P><FONT size="5">S t o r e 0 5</FONT>FILE TRANSFER</P>
<P><A href="ftp://www.idc.co.jp/user01/store01/AN01.txt">A N 0 1. T X T</A><BR>
<A href="ftp://www.idc.co.jp/user01/store01/AN03.txt">A N 0 3. T X T</A><BR>
<A href="ftp://www.idc.co.jp/user01/store01/doc01.txt">d o c 0 1. T X T</A><BR>
<A href="ftp://www.idc.co.jp/user01/store01/doc05.txt">d o c 0 5. T X T</A><BR>
<A href="ftp://www.idc.co.jp/user01/store01/pic02.jpg">p i c 0 2. j p g</A></P>
</BODY>
</HTML>
```

MEETING DATA ARE ATTACHED.
* * * * * * * * * * * * * * * * * * * * *
* * * * * * * * * * * * * * * * * * * * *
* * * * * * * * * * * * * * * * * * * * *
* * * * * * * * * * * * * * * * * * * * *

LINK TRANSMISSION:
ACCESS TO THE URL BELOW FOR THE
ATTACHED FILE AND DOWNLOAD IT BY FILE
TRANSFER.

Http://www.IDC.co.jp/User01/index01.htm

A9

ELECTRONIC MAIL SENDING DEVICE, INFORMATION PROCESSOR, IMAGE PROCESSING SYSTEM, AND COMPUTER PRODUCT

CROSS-REFERENCE TO RELATED APPLICATIONS

The present document incorporates by reference the entire contents of Japanese priority document, 2003-306589 filed in Japan on Aug. 29, 2003.

BACKGROUND OF THE INVENTION

1) Field of the Invention

The present invention relates to a technology for sending/receiving electronic mails.

2) Description of the Related Art

In recent years, electronic mail has widely been used in the world. The electronic mail can usually be sent with a desired attached file. Japanese Patent Application Laid-Open Publication No. 2003-134296 discloses a technique for sending electronic mails with files as attachments.

However, the electronic mails are intended to send and receive small-volume data such as text and not large-volume data such as image files or sound data. Simple Mail Transfer Protocol (SMTP) is used as a standard specification for electronic mail over the Internet. In SMTP, mail servers send and receive every piece of mail to and from each other. Therefore, if the volume of the attached file is large, large load is put on the electronic mail systems, and the electronic mail systems may crash or become slow. To avoid this, there is a tendency to impose limitations on the volume of an attachment. It that case, the sender is required to divide a large-volume data into two or more pieces and the receiver the required to combine the pieces.

On the other hand, File Transfer Protocol (FTP) is available for sending or receiving large-volume data. However, the FTP requires a special software called FTP software. The data is first uploaded into directory or so in the storage unit of the Internet server (FTP server). Since this requires beforehand preparation of disk space, creation of directories, the process is rather difficult, confusing, and complicated for a common man and also puts burden on the user.

Digital cameras, IC recorders etc. are becoming popular day by day. Therefore, means and method for easily transmitting large-volume data is being researched.

SUMMARY OF THE INVENTION

It is an object of the present invention to solve at least the problems in the conventional technology.

According to an aspect of the present invention, when sending an electronic file to a receiver, the file is transmitted to a predetermined location. Then, an electronic mail is created and sent to the receiver. This electronic mail contains information that makes it possible for the receiver to download the file from the location. Finally, the electronic mail created is sent to the receiver without attaching the file.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 12 is an explanatory drawing of a screen display example of link information;

FIG. 13 is an explanatory drawing of another screen display example of the link information;

FIG. 14 is an explanatory drawing of data of the link information;

FIG. 15 is an explanatory drawing of the data of the link information; and

FIG. 16 is an explanatory drawing of a screen display example of electronic mail.

DETAILED DESCRIPTION

Exemplary embodiments of an electronic mail sending device, an information processor, an image processing system, and computer products according to the present invention will be explained below with reference to accompanying drawings.

The present embodiment in an example in which composite functions such as a copy function, a facsimile (FAX) function, a printing function, a scanning function and a function to deliver an input image (an original image read out by the scanning function and an image input by the printing or FAX function) are applied to a so-called digital color multifunction product as an information processor.

Figure 1:
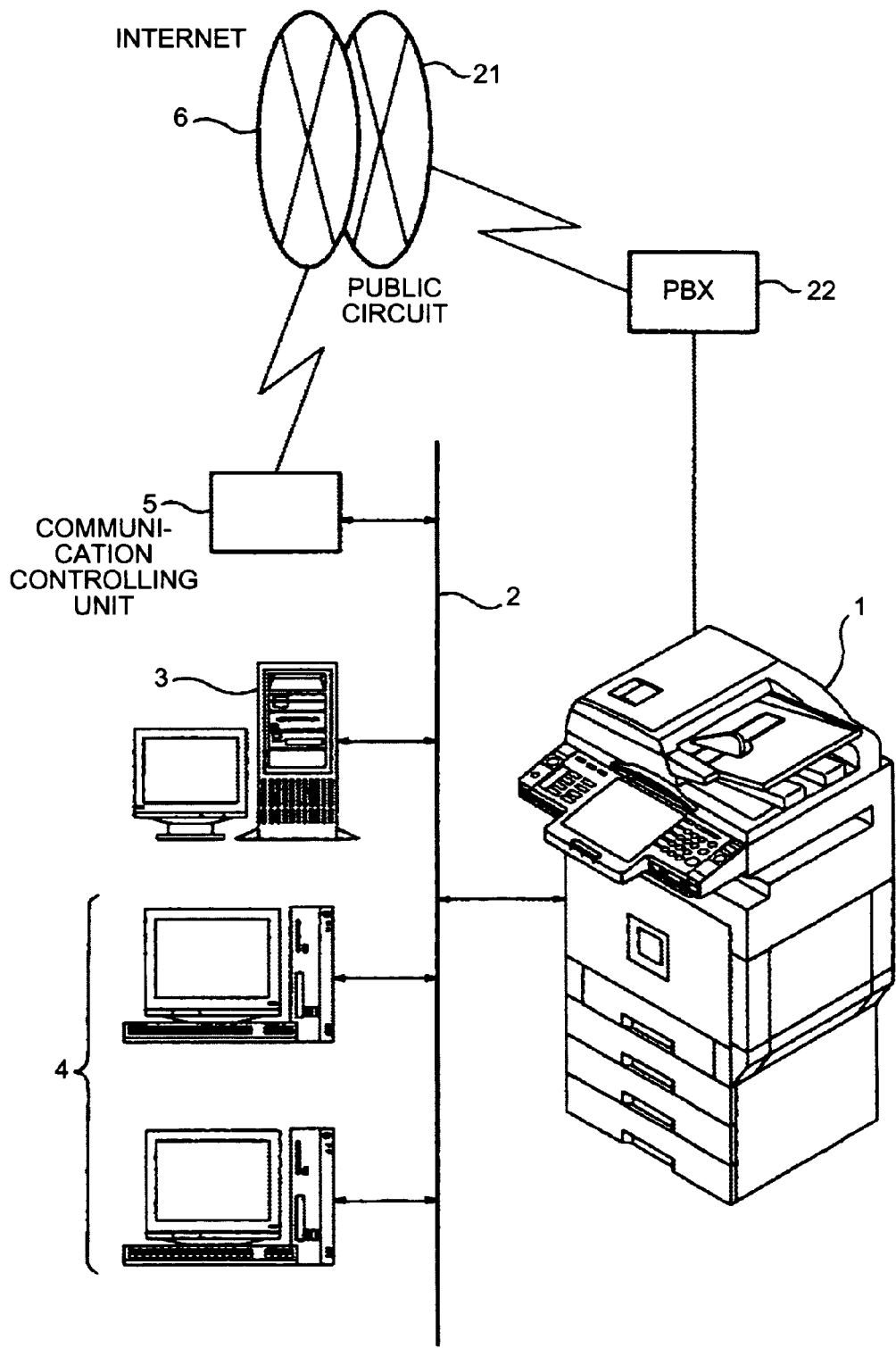
FIG. 1 is a block diagram of a system that includes a digital color multifunction product of an embodiment according to the present invention.

FIG. 1 is a block diagram of a system that includes a digital color multifunction product 1 according to an embodiment of the present embodiment. As shown in FIG. 1, a system in which a server computer 3 to execute various kinds of information processing and a plurality of client computers 4 are connected to the digital multifunction product 1 via local-area networks 2 (LAN) serving as a communication network is assumed in the present embodiment. The server computer 3, for example, supports the File Transfer Protocol (FTP) and the Hypertext Transfer Protocol (HTTP), and realizes the functions of Web server and Domain Name Server (DNS). In other words, in this system, an environment in which the image input function (scanning function), the image output function (printing function) and the image processing function such as an image storage function provided to the digital color multifunction product 1 can be shared on the LANs 2 is configured.

This system is connected to an Internet network 6 via a communication controlling unit 5 and configured so as to allow data communications to external environments via the Internet network 6. A router, a switching system, a modem, a data set level (DSL) modem or the like is typical of the communication controlling unit 5, and anyone of them may be acceptable as long as it is at least capable of one of Transmission Control Protocol (TCP) and Internet Protocol (IP) communications. Moreover, the LAN 2 is not limited to cable communication but radio communication (infrared rays, radio waves and so on) may be acceptable. In addition, the LAN 2 may employ optical fiber.

Figure 2:
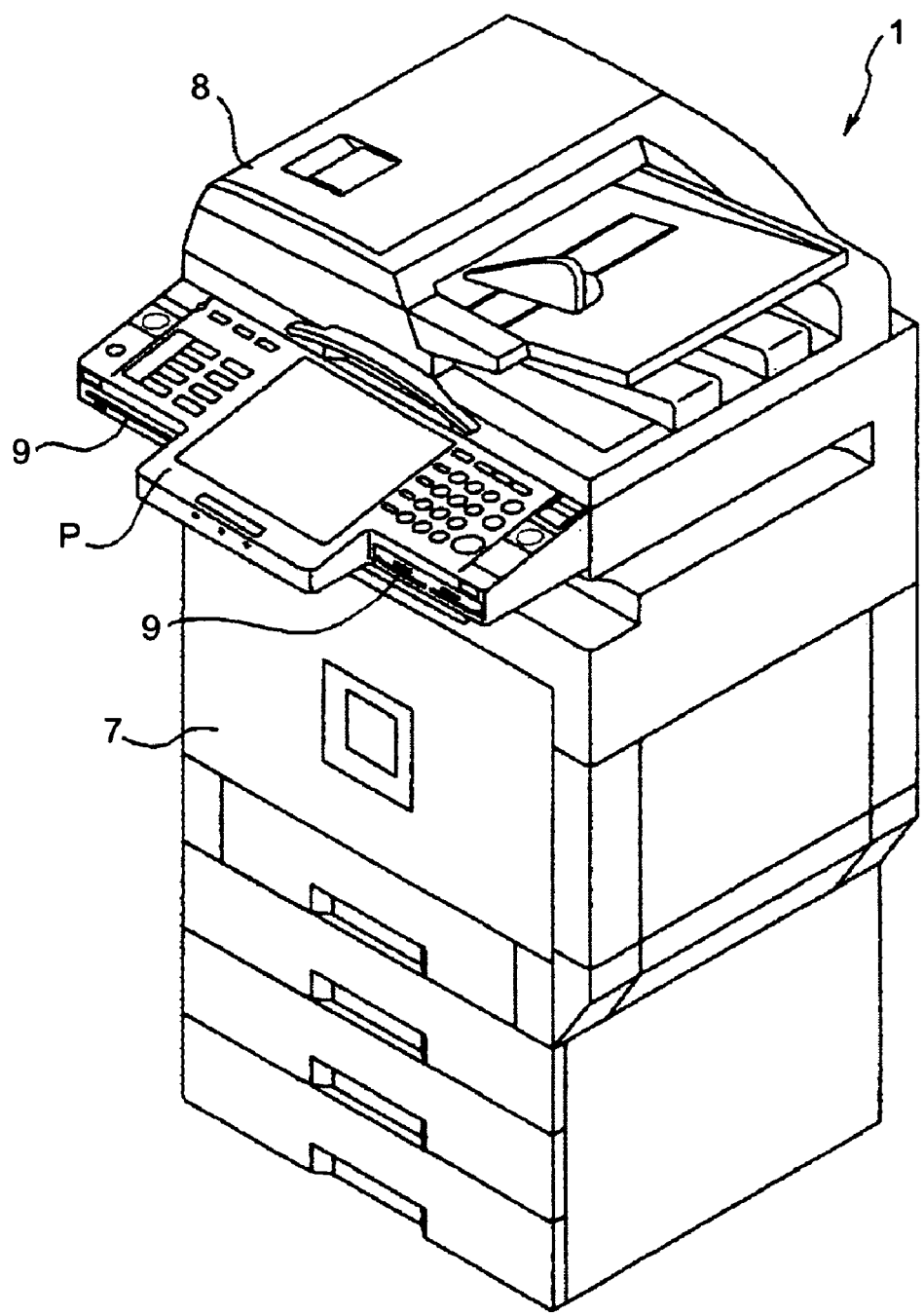
FIG. 2 is an external perspective of the digital color multifunction product.
Figure 3:
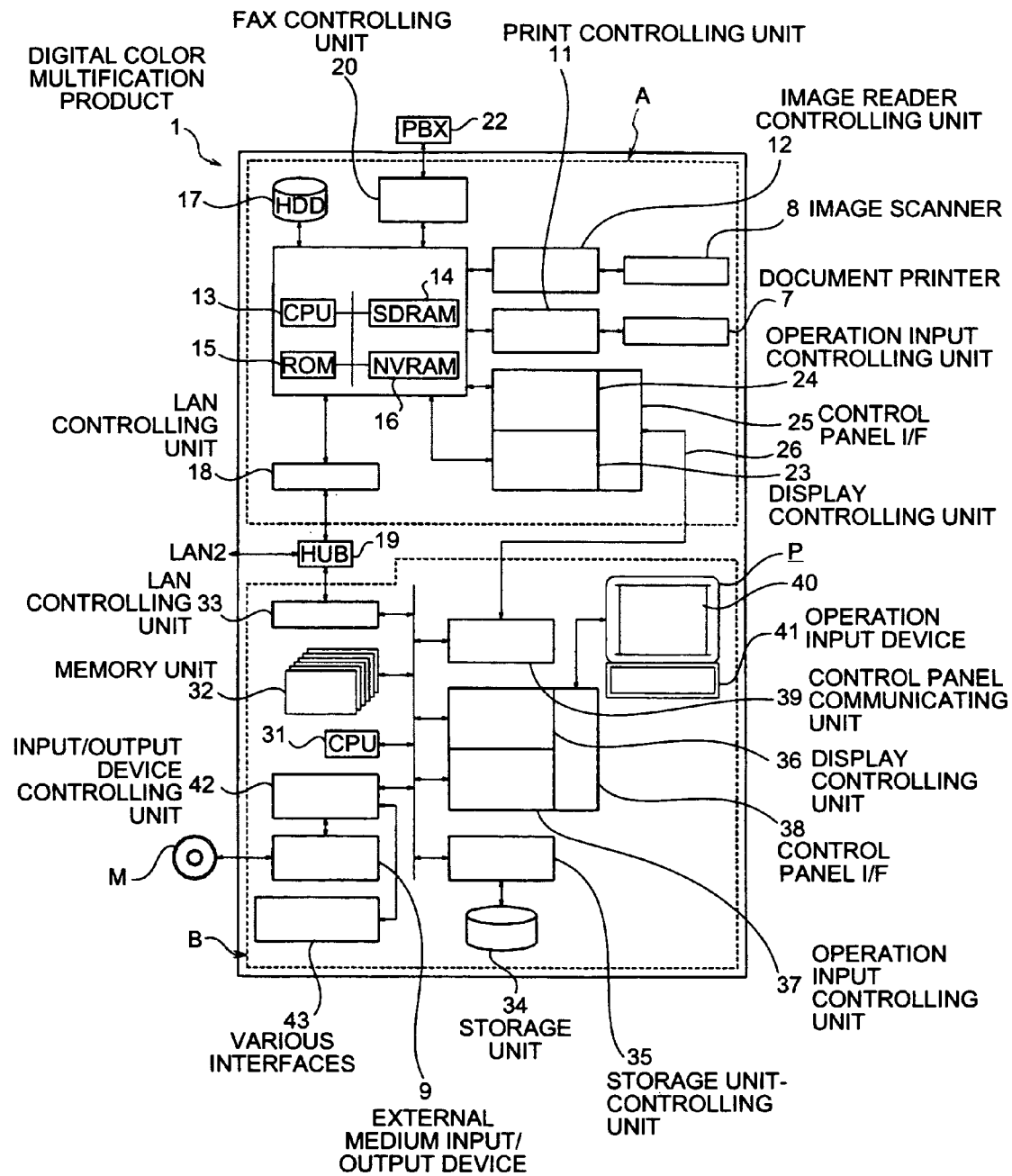
FIG. 3 is a block diagram of the digital color multifunction product.

The digital color multifunction product 1 will be explained next. FIG. 2 is an external perspective of the digital color multifunction product 1. FIG. 3 is a block diagram of the digital color multifunction product 1. As shown in FIG. 2, the digital color multifunction product 1 is configured by providing an image scanner 8 to read out an image of an original mounted on the upper portion of a document printer 7 that is an image forming apparatus to form an image on a medium such as transfer paper. Moreover, an operation panel P capable of showing a display to an operator and accepting a variety of inputs such as function settings set by the operator is provided on the exterior of the image scanner 8. Furthermore, an external medium input/output device 9 that is a device to read out program codes, image data and the like stored on a storage medium M (see FIG. 3) such as optical disk, flexible disk, and to write program codes, image data and the like on the storage medium M is provided on the lower portion of the operation panel P with an insertion inlet exposed outside to accept insertion of the storage medium M.

The structure of such a digital color multifunction product 1 is largely divided into an image processing unit A and an information processing unit B as shown in FIG. 3. The document printer 7 and the image scanner 8 belong to the image processing unit A and the operation panel P and the external medium input/output device 9 belong to the information processing unit B.

The image processing unit A is explained next. The image processing unit A provided with the document printer 7 and image scanner 8 is provided with an image processing controlling unit 10 to control the whole image processing in the image processing unit A. To the image processing controlling unit 10, a print controlling unit 11 to control the document printer 7 and an image reader controlling unit 12 to control the image scanner 8 are connected.

The print controlling unit 11 outputs a print command including image data to the document printer 7 according to the control of the image processing controlling unit 10, and then allows the document printer 7 to form an image on a medium such as transfer paper. The document printer 7 is capable of printing in full colors. The printing method can be selected from a variety of methods such as an electrophotographic method, an ink jet method, a dye-sublimation method, a silver-salt photographic method, a thermo-autochrome method, and a thermal wax transfer method.

The image reader controlling unit 12 drives the image scanner 8 by control from the image processing controlling unit 10, reads out an original by condensing the reflected light of the radiated lamp on the surface of the original with a mirror and a lens in a photoreceptor, for example, a charge coupled device (CCD) to convert analog-to-digital (A/D), thereby generating digital image data with eight bits of each of red, green and blue (RGB).

The image processing controlling unit 10 is configured as a microcomputer by connection across the bus to a central processing unit 13 (CPU) serving as a main processor, a synchronous dynamic random access memory 14 (SDRAM) that temporarily stores the image date read by the image scanner 8 to supply it to the document printer 7 to form an image, a read only memory (ROM) 15 that stores a control program and the like, and a non volatile random access memory (NVRAM) 16 that records system log, system setting, log information, and the like, and that is capable of retaining the data even at the time when the power is off.

To the image processing controlling unit 10 are connected a hard disk drive (HDD) 17 that serves as a storage unit to store a large volume of accumulated image data, job history and the like, a LAN controlling unit 18 to connect the image processing unit A to the LAN 2 via a HUB 19 that serves as a line concentrator provided inside of the product, and a FAX controlling unit 20 to execute FAX control. The FAX controlling unit 20 is connected to a private branch exchange (PBX) 22 communicating with a public telephone network 21, thereby the digital color multifunction product 1 can communicate with a remote facsimile.

In addition, to the image processing controlling unit 10, a display controlling unit 23 and an operation input controlling unit 24 are connected. The display controlling unit 23 outputs image display control signals by control from the image processing controlling unit 10 to the information processing controlling unit B via communication cables 26 connected to a control panel I/F 25, thereby controlling the image display on the operation panel P of the information processing unit B. Furthermore, the operation input controlling unit 24 inputs input control signals according to the function settings or the input operation set by an operator on the operation panel P of the information processing unit B by control from the image processing controlling unit 10 via the communication cables 26 connected to the control panel I/F 25. In other words, the image processing unit A is configured so as to directly monitor the operation panel P of the information processing unit B via the communication cables 26.

Accordingly, the image processing unit A is designed to utilize the operation panel P of the information processing unit B via the communication cables 26 to an image processing unit provided to a conventional image processor. That is, the display controlling unit 23 and the operation input controlling unit 24 of the image processing unit A act through connection to the operation panel P.

The image processing unit A analyzes print data that are image information from the outside (server computer 3, client computers 4, facsimile and the like) and a command to command printing, converts to bitmaps so that the print data may be printed as output image data, and determines an action by analyzing the printing mode from the command. The image processing unit A is operated by receiving the print data and the command through the LAN controlling unit 18 or the FAX controlling unit 20.

Moreover, the image processing unit A can transfer the print data, the document reading data, the output image data processed for output of these data, and compressed date compressed for these data that are all stored on the SDRAM 14 or the HDD 17 to the outside (server computer 3, client computers 4, facsimile and the like).

In addition, the image processing unit A transfers the image data read by the image scanner 8 to the image processing controlling unit 10, corrects signal degradation associated with optical system and quantization of digital signals, and writes the image data onto the SDRAM 14. The image date stored on the SDRAM 14 is converted to output image data in the print controlling unit 11, followed by outputting the output image data to the document printer 7.

The information processing unit B provided with the operation panel P will be explained next. The information processing unit B is configured as a microcomputer controlled by a general-purpose operating system (OS) that is used for an information processor such as so-called personal computer in general. The information processing unit B has a CPU 31 that is a main processor. To the CPU 31, a memory unit 32 configured with a random access memory (RAM) that serves as a work area of the CPU 31 and a ROM that is a read only memory and stores start-up programs and so on, and a storage unit-controlling unit 35 to control input/output of the data to the storage unit 34 such as HDD storing operating system (OS) and an application program are connected across the bus.

To the CPU 31, a LAN controlling unit 33 that serves as a communication interface to connect the information processing unit B to the LAN 2 via the HUB 19 is connected. An IP address that is a network address allocated to the LAN controlling unit 33 is different from an IP address allocated to the LAN controlling unit 18 in the image processing unit A as described above. In other words, two IP addresses are allocated to the digital color multifunction product 1 of the present embodiment. That is, each of the image processing unit A and the information processing unit B is connected to the LAN 2, respectively, and data exchange is allowed between the image processing unit A and the information processing unit B in the configuration.

The digital color multifunction product 1 is connected to the LAN 2 via the HUB 19, which seems like only one IP address allocated in appearance. Accordingly, it is possible to handle wire connections and the like with ease without disfiguring its appearance.

Figure 4:
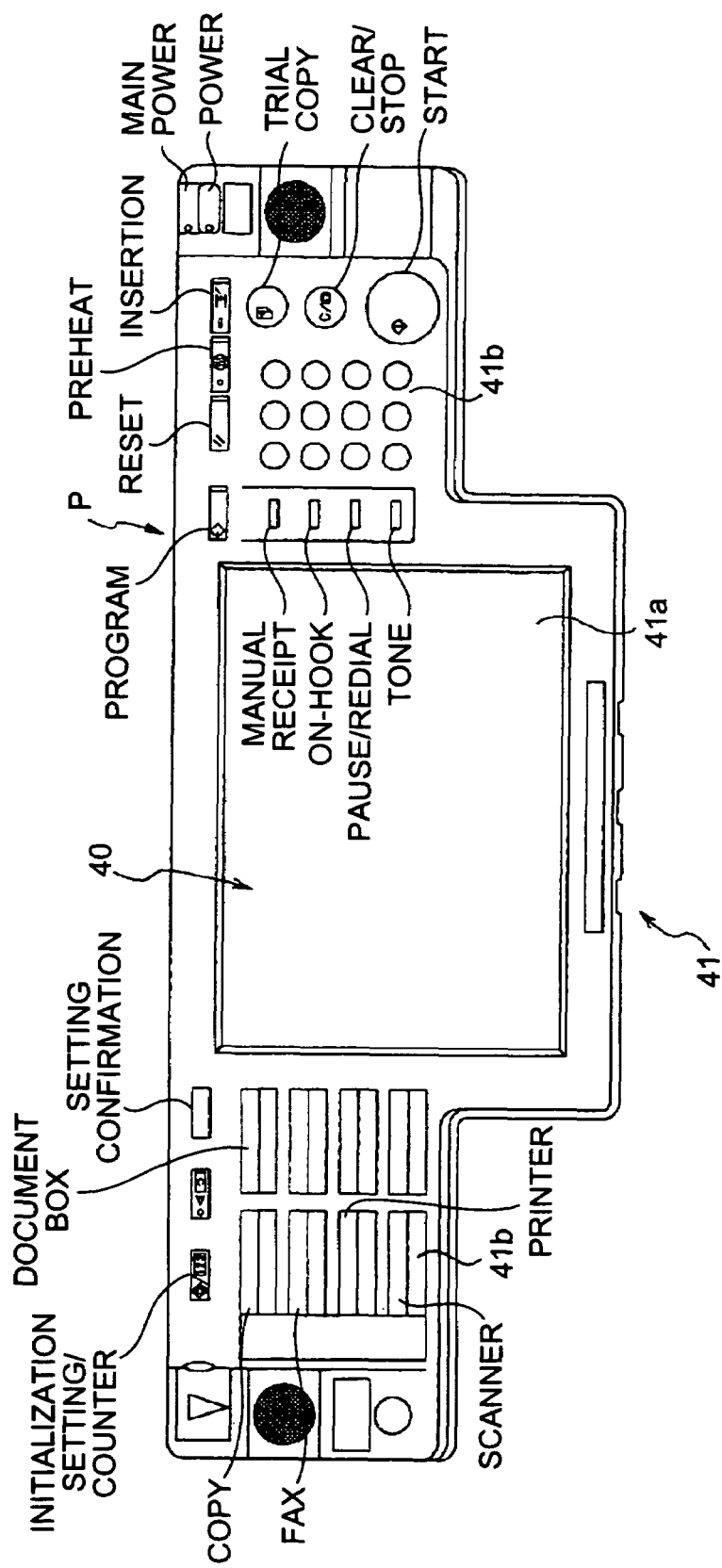
FIG. 4 is a top plan view of an operation panel.

Furthermore, to the CPU 31, a display controlling unit 36 to control the operation panel P and an operation input controlling unit 37 are connected. FIG. 4 is a top plan view of the operation panel P. As is shown in FIG. 4, the operation panel P is configured with a display 40, that is, for example, a liquid crystal display (LCD), and an operation input device 41. The operation input device 41 is configured with a touch panel 41a layered on the surface of the display 40 in an ultrasonic elastic wave system or the like, and a keyboard 41b having a plurality of keys. The keyboard 41b is provided with a start key to declare initiation of image reading, ten keys to input numerals, a reading condition setting key to set a user destination to which image data read are sent, a clear key, and the like. That is, the display controlling unit 36 outputs image display control signals to the display 40 via a control panel I/F 38, thereby allowing the display 40 to display predetermined items according to the image display control signals. On the other hand, the operation input controlling unit 37 receives input control signals corresponding to the function setting and the input operation set by an operator on the operation input device 41 via the control panel I/F 38.

In addition, to the CPU 31, the control panel I/F 25 of the image processing unit A and a control panel communicating unit 39 connected via communication cables 26 are connected. The control panel communicating unit 39 receives image display control signals output from the image processing unit A as well as transfers input control signals from the operation panel P according to the function setting and the input operation set by an operator to the image processing unit A. The image display control signals from the image processing unit A received at the control panel communicating unit 39 are output to the display controlling unit 36 after a conversion process of the data for the display 40 of the operation panel P, and also the input control signals according to the function setting and the input operation set by the operator on the operation panel P are input to the control panel communicating unit 39 after a conversion process of the data into a format according to the specification of the image processing unit A, which will be described in detail hereinafter.

As described above, the storage unit 34 stores the operating system (OS) and application programs that are executed by the CPU 31. This means that the storage unit 34 functions as a storage medium to store the application programs. In the digital color multifunction product 1, when a user puts on the power, the CPU 31 activates the start-up program in the memory unit 32, and the OS stored in the storage unit 34 is read into the RAM inside of the memory unit 32, thereby activating the OS. Such an OS activates programs according to the operation set by the user, reads out information, and retains it. Windows (trademark) and the like are well known as a typical OS. The action programs running on the OS are called application programs. The OS in the information processing unit B is the same kind of OS as that of information processor (server computer 3, client computers 4, and the like). That is, the OS is a general-purpose OS (for example, Windows, a product of Microsoft (Windows is a trademark), and the like).

As described above, the external medium input/output device 9 is installed in the digital color multifunction product 1 of the present embodiment. The external medium input/output device 9 includes flexible disk drive device, optical disk drive device, magneto-optical (MO) drive device, media drive device, and the like. These are devices to read out program codes, image data, and the like stored on a storage medium M, or to write program codes, image data, and the like on the storage medium M. The storage medium M may store an OS, a device driver, various program codes such as a variety of application programs (control program), and image data, and may be any of flexible disk, hard disk, optical disk (compact disk (CD)-ROM, CD-recordable (R), CD-rewritable (RW), digital video disc (DVD)-ROM, DVD-RAM, DVD-R, DVD+R, DVD-RW, DVD+RW, and so on), magneto optical disk (MO), and semiconductor medium. Such an external medium input/output device 9 is controlled by an input/output device controlling unit 42 connected to the CPU 31 across the bus.

Accordingly, the application programs stored in the storage unit 34 may be the one that is installed from the application programs recorded on the storage medium M. Thus, the storage medium M may serve as a storage medium to store the application programs. Furthermore, the application programs may be fetched from the outside via, for example, the Internet network 6 and LAN 2 and installed in the storage unit 34.

The input/output device controlling unit 42 is also connected to a variety of interfaces 43 such as universal serial bus (USB), Institute of Electrical and Electronics Engineers (IEEE) 1394, and small computer systems interface (SCSI), and the input/output device controlling unit 42 can be connected to a variety of equipments (digital camera and so on) via a variety of interfaces 43.

As is described above, the image processing unit A executes predetermined processes to handle images, and, in this example, serves as an image processor to form an image, read out an image, send and receive an image, and the like. The information processing unit B executes a variety of information processes and serves as an information processor to intensively control each unit of the information processing unit B and the image processing unit A, and also as an electronic mail sending device, which makes the digital color multifunction product 1 an image processing system.

The image processing unit A and the information processing unit B can be connected to the Internet (network) 6 via the LAN controlling units 18 and 33 provided to the image processing unit A and the information processing unit B, respectively. Therefore, the digital color multifunction product 1 can send an electronic mail via the Internet 6.

Specifically, in the information processing unit B, a standard OS that can execute the application programs runs as described above. The functions of the standard OS and the application programs make it possible to access to a server over the Internet 6 and utilize Internet services such as electronic mail and file transfer. Owing to the above system, a user can transfer a file such as an image file stored in the HDD 17 or the storage unit 34 as an attached file to the electronic mail to the user destination accessible to the Internet 6.

In the information processing unit B, the standard OS as described above is used, which allows application programs that are guaranteed of proper operation on the standard OS to be used as a matter of course. The information processing unit B can execute processes in the way described later to send an electronic mail accompanied with a desired attached file to a desired user destination by an electronic mail creation program, a transmission link program, and the like that are the application programs provided to execute the programs of the present invention installed in the storage unit 34. The electronic mail creation program and the transmission link program are read from the storage medium M or downloaded from network such as the Internet 6 to be installed in the storage unit 34.

Figure 5:
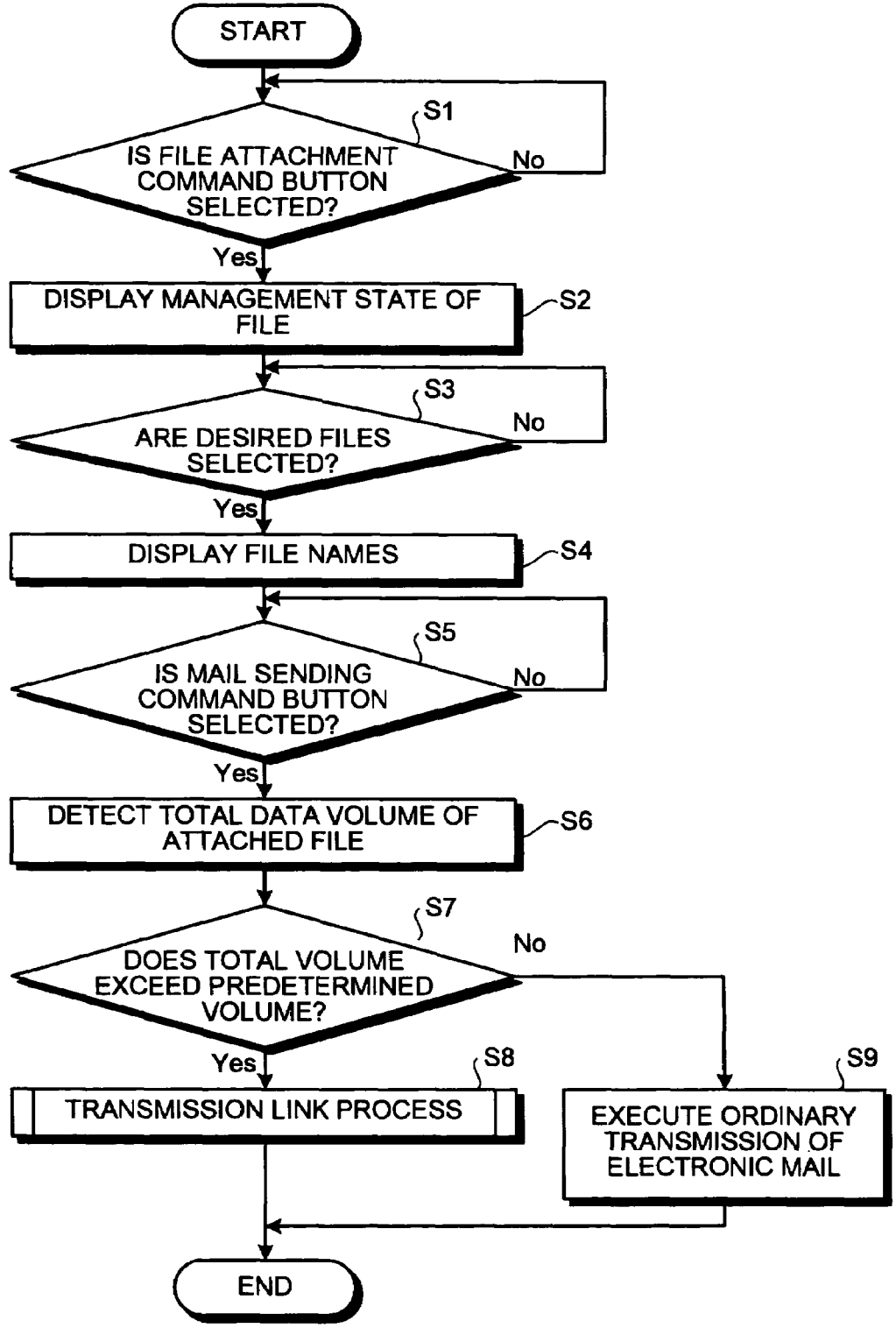
FIG. 5 is a flow chart of a process procedure performed by an information processing unit.
Figure 6:
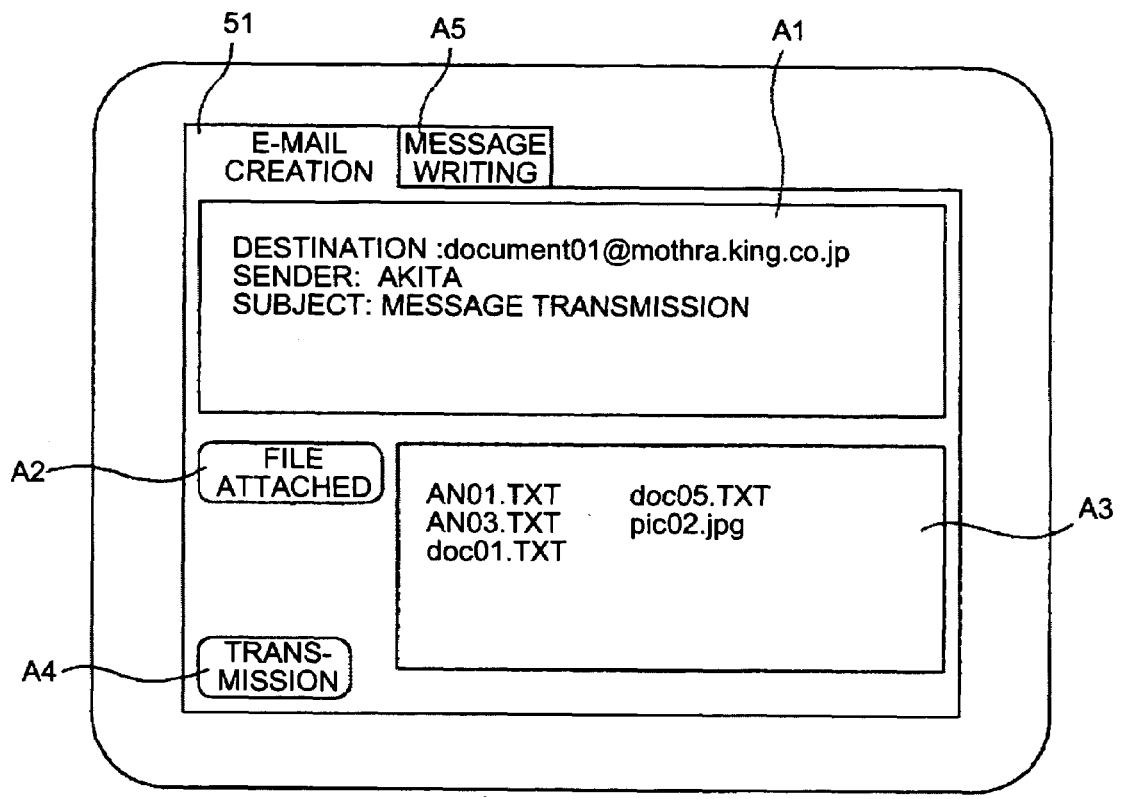
FIG. 6 is a top plan view of an example of a screen display at the time of creation of electronic mail.

FIG. 5 is a flow chart of the process procedure. When the CPU 31 activates the electronic mail creation program and the transmission link program from the standard OS, an electronic mail creation screen 51 is displayed on the display 40 by the mail creation program as shown in FIG. 6. On the electronic mail creation screen 51, an electronic mail transmitting information display A1, a file attachment operation button A2, an attached file name display A3, an electronic mail sending command button A4, and the like are displayed.

Figure 7:
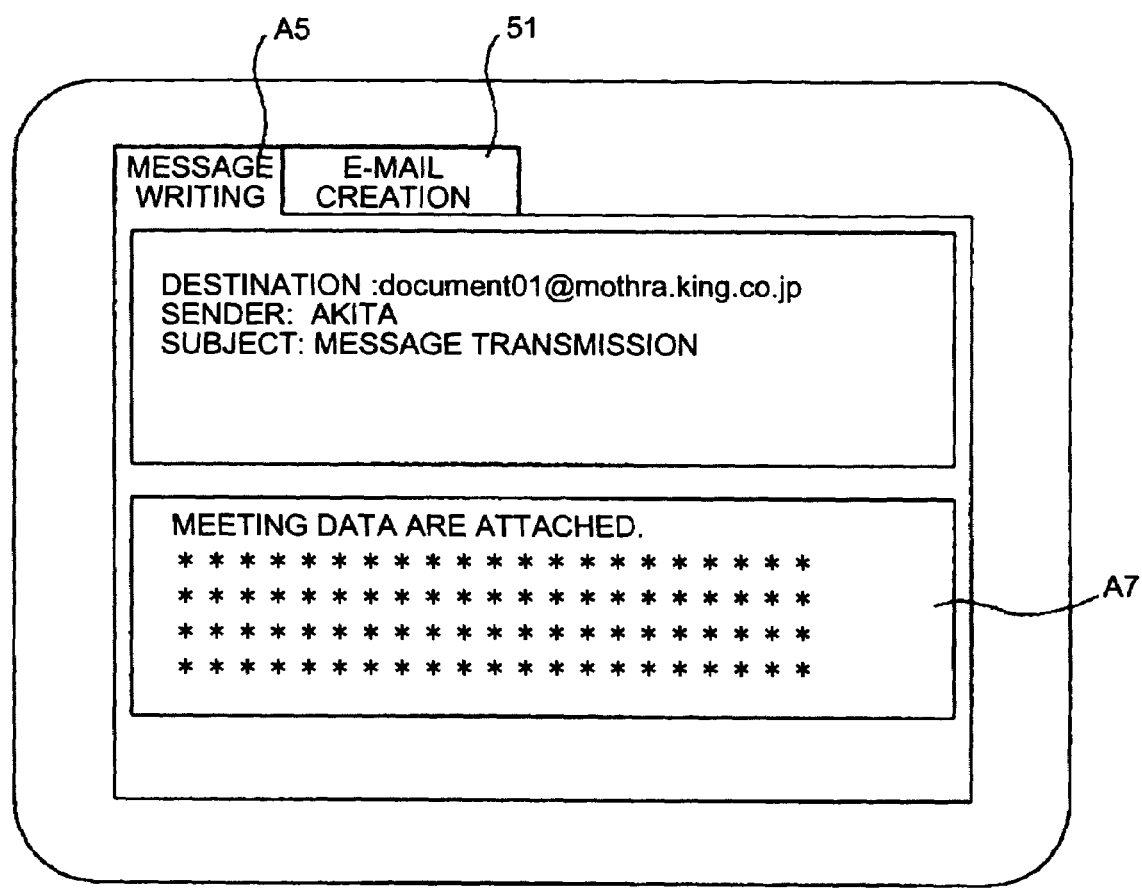
FIG. 7 is a top plan view of another example of the screen display at the time of creation of the electronic mail.

When a message for the electronic mail is input, a tab A5 is selected to switch the screen to the screen shown in FIG. 7 and then the message can be input. The message is written in a message area A7. The electronic mail creation program can create an electronic mail and execute the function of the electronic mail sending unit to transmit the written electronic mail accompanied with a desired attached file.

Figure 8:
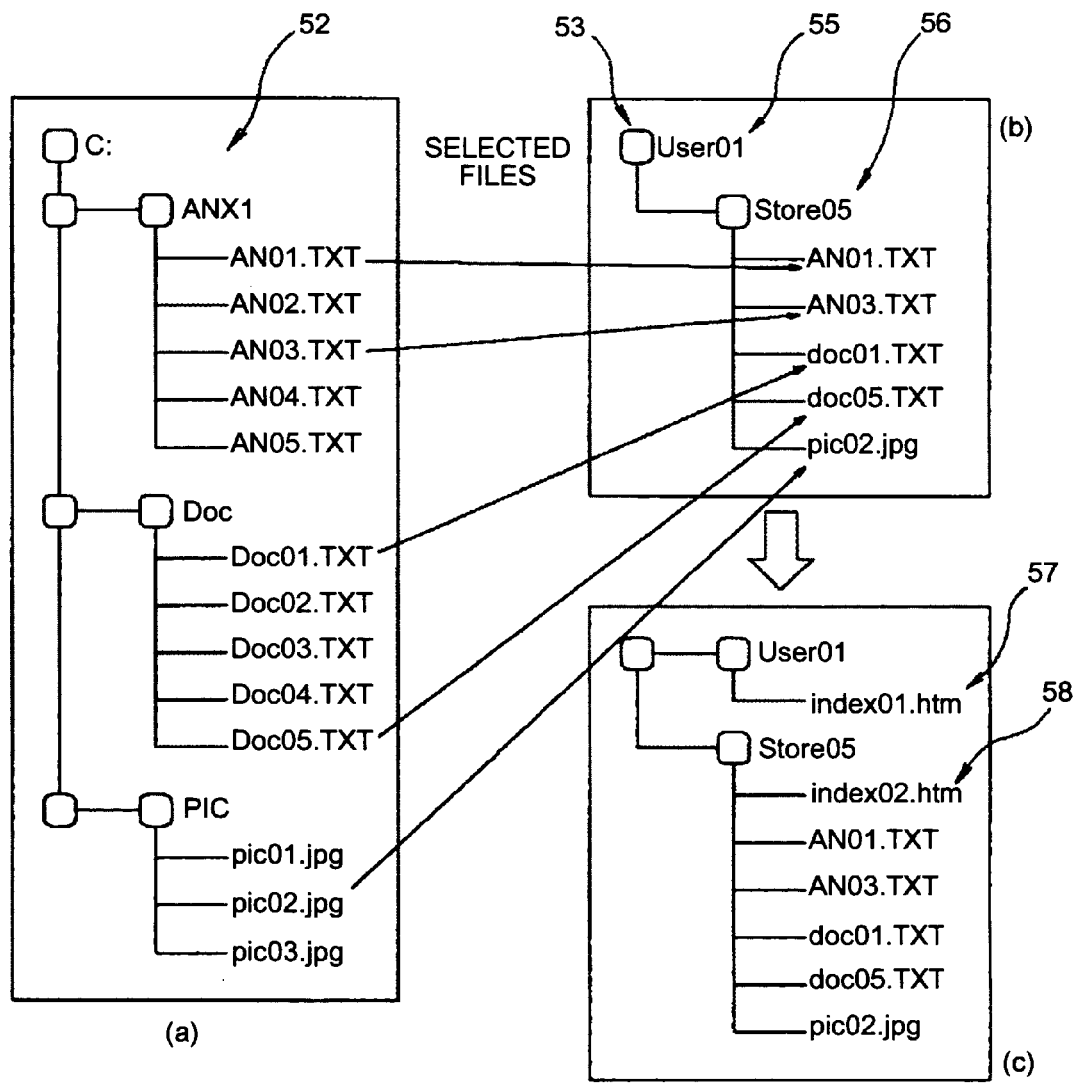
FIG. 8 is an explanatory drawing of a management state of files stored, and for explaining how the files and link information are uploaded to an Internet server.

When a desired file is attached to the electronic mail, a file attachment operation button A2 shown in FIG. 6 is selected (step S1-Y). By this selection, desired files stored in the HDD 17 or the storage unit 34 can be selected. For example, a management state of files stored in the HDD 17 and the storage unit 34 is displayed on the screen as shown in (a) in FIG. 8 (it is shown on a directory 52) (step S2). The attached files can be selected from the files shown on the directory 52. On selecting the desired files (step S3-Y), the selected files are specified as attached files, and then the file names are displayed on the attached file name display A3 as shown in FIG. 6 (step S4). Through these steps, creation of the electronic mail accompanied with the attached files is completed.

Figure 9:
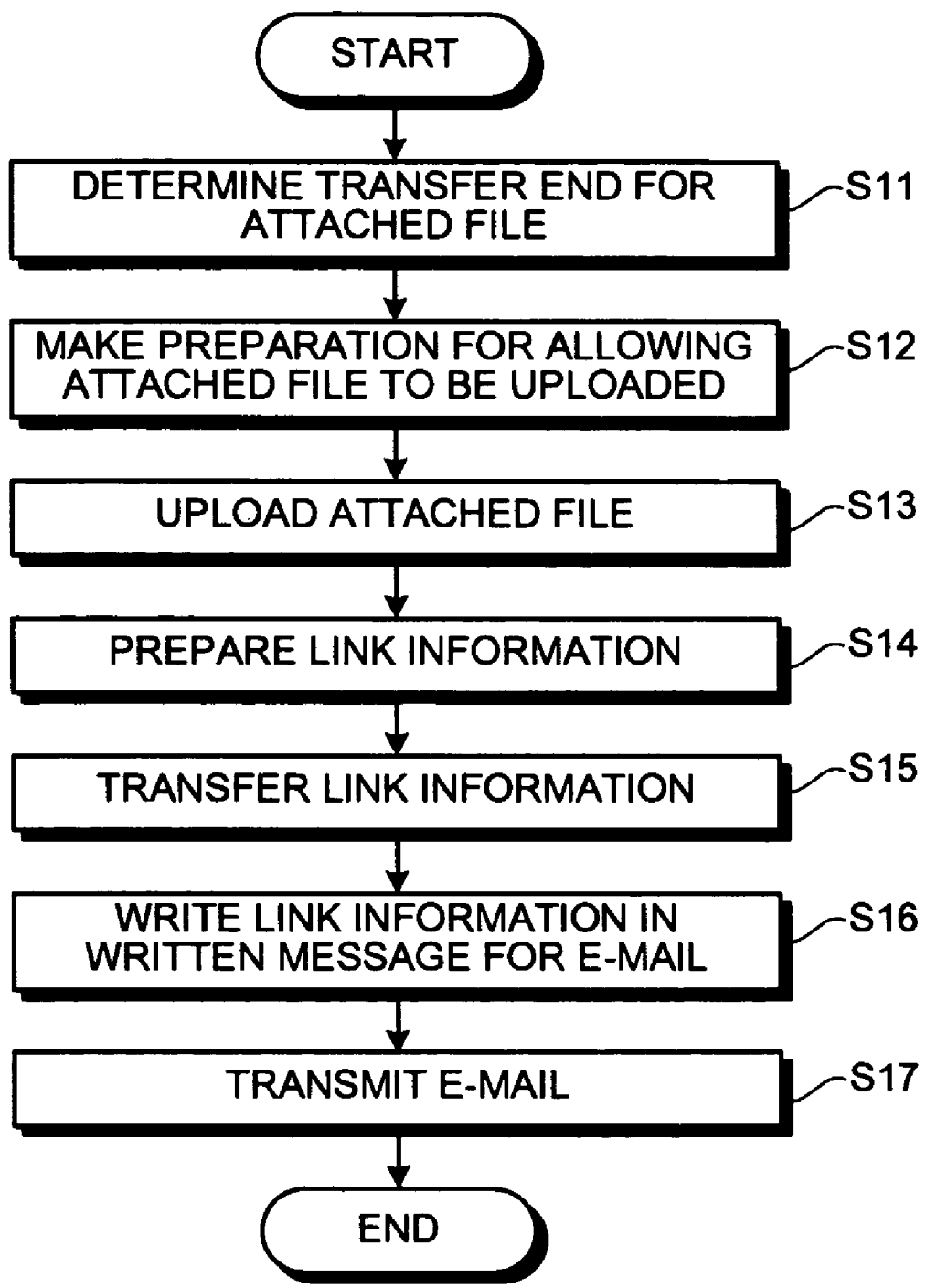
FIG. 9 is a flow chart of a process procedure performed by the information processing unit.

To transmit the electronic mail next, the mail sending command button A4 shown in FIG. 6 is selected (step S5-Y). At this step, the electronic mail creation program detects the total data volume of the attached files selected as described above (data volume detecting unit) (step S6). When the total volume exceeds the predetermined volume set in advance (step S7-Y), the process (transmission link process) shown in FIG. 9 is automatically initiated based on the transmission link program (step S8) (described later). When the total data volume of the attached files is equal to or less than the predetermined volume at this step (step S7-N), an ordinary transmission of electronic mail with the written message that is sent by being accompanied with attached files is executed by the function of the electronic mail sending unit described above (step S9).

Figure 10:
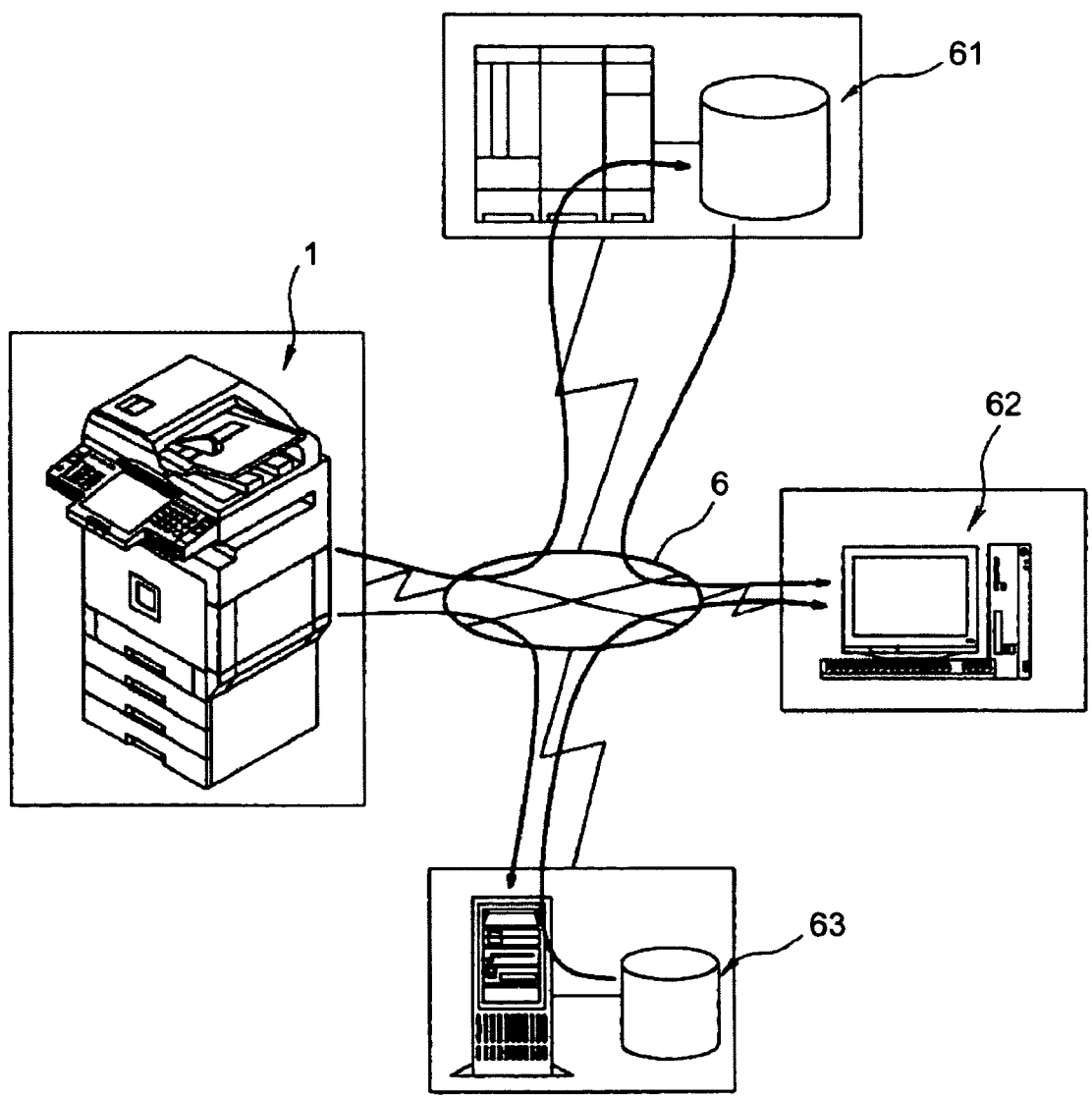
FIG. 10 is an explanatory drawing of the connections of the digital color multifunction product, a user destination terminal, an Internet server, and a mail server to the Internet.

The transmission link process (step S8) will now be explained based on the flow chart shown in FIG. 9. First, a transfer end for the attached files selected at the step S3 is determined (step S11). That is, the attached files can be uploaded to a predetermined Internet server 61 through the transmission link program as shown in FIG. 10. In other words, it is allowed to use the File Transfer Protocol over the Internet 6. The attached files are to be concentratedly transferred (uploaded) to a specified folder 53 (folders 55 and 56. See FIG. 8.) in the Internet server 61 as shown in (b) in FIG. 8. Accordingly, the folder 53 capable of accepting the transfer is required in the Internet server 61 before initiation of the transfer. Preparation of the folder 53 in an authorized area in the Internet server 61 is allowed by the use of the File Transfer Protocol of the transmission link program.

In this case, a name for the folder 53 is determined from the contents of a history information management table 54 (FIG. 11) managed by the transmission link program. Namely, the history information management table 54 managed by the transmission link program is a table to manage the folder 53 (folders 55 and 56) that has been prepared in the Internet server 61 in advance. In the history information management table 54 are recorded a main folder 71 and a sub-holder 72 in which names of the main and sub-folders are cataloged, work history 73 to record whether data have been uploaded to the main folder 71 and sub-holder 72, transfer date 74 to show dates when the data uploads are executed, and transfer end user 75 to catalog electronic mail addresses of user destinations that are receiving ends to come to download the data from the main folder 71 and sub-folder 72 as described later.

Figure 11:
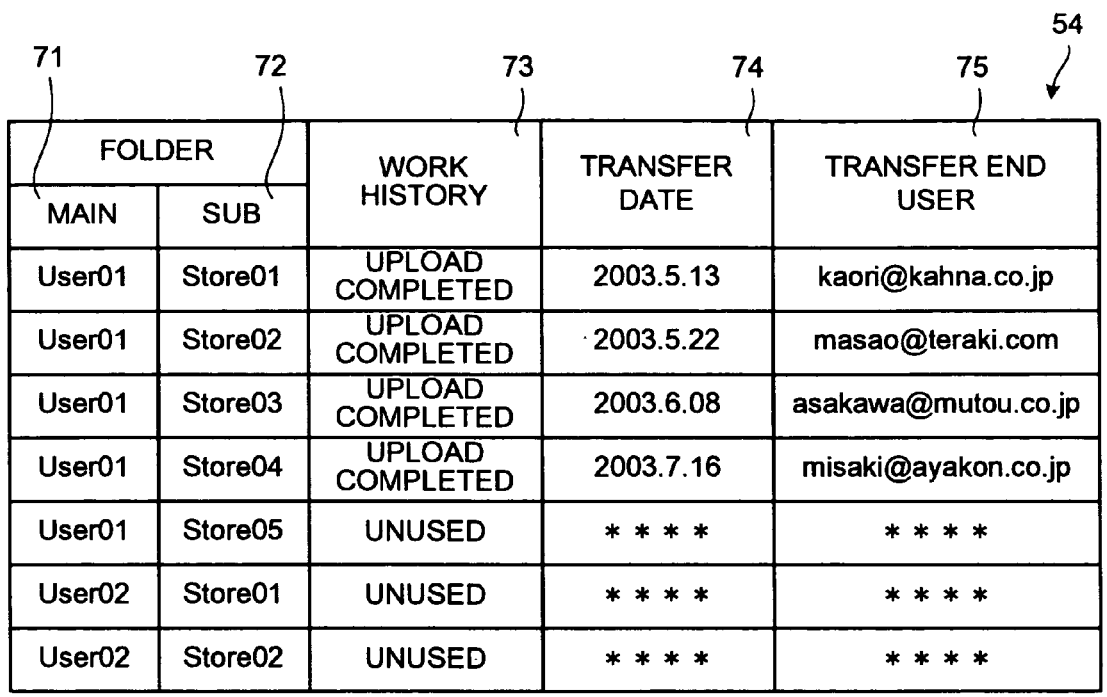
FIG. 11 is an explanatory drawing of a history information management table.

Next, the main folder 71 and the sub-folder 73 that are not recorded with "Upload completed" on the work history 73 are selected from the history information management table 54 in FIG. 11 as usable names. In an example to be explained here, "User 01" and "Store 05" as the names of the main folder 71 and the sub-folder 73, respectively, both of which are not recorded with "Upload completed" on the work history 73, are selected. The history information management table 54 shown in FIG. 11 is the data stored in the storage unit 34.

Next, a transfer end for the attached file is determined. When the folder 53 allocated to the transfer end for the attached file is specified (step S11), preparation is made for allowing the attached file to be uploaded toward the folder 53 (step S12). Then, the upload of the attached file to the Internet server 61 starts (step S13). This upload is executed with the use of the File Transfer Protocol. When the transfer is completed, the connection of the transmission link program to the Internet server 61 is temporarily terminated. When the upload has been executed, "Upload completed" is recorded in the work history 73 corresponding to the appropriate main folder 71 and sub-folder 72 in the history information management table 54, and the date when the upload has been executed is recorded in the transfer date 74. Furthermore, the electronic mail address of the user destination of the electronic mail to be sent at a step S17 described later is recorded in the column of the transfer end 75.

Next, the transmission link program prepares link information (step S14). The link information means the information that allows a user that is a mail receiving end (user that is the file transfer end) to download the files (that were the attached files) uploaded to the Internet server 61 for file transfer. Specifically, the transmission link program is the display information and the like on the screen as shown in FIGS. 12 and 13. The information is shown on a user's terminal 62 (FIG. 10) that is a file transfer end and is generally displayed with the use of Web browser software. In other words, it is a structured document that is generally called hypertext markup language (HTML) document. For example, the display shown in FIG. 12 displays the data shown in FIG. 14. Similarly, the display shown in FIG. 13 displays the data shown in FIG. 15. Owing to the displays on the screen, a file transfer end user can know which files (the files attached to the electronic mail) should be obtained by downloading.

Through these steps, the link information shown in FIGS. 10 and 11 is prepared by the transmission link program (step S14). The information and the condition settings to prepare the link information are prepared based on the contents in the history information management table 54 and the conditions set as default settings. The prepared link information is transferred to the Internet server 61 by the transmission link program, similarly to the uploading of the files described above (step S15). For example, to the folder 55 of "User01" ((b) in FIG. 8), the link information of "Index01.htm" is uploaded (numeral 57 in (c) in FIG. 8). Furthermore, to the folder 56 of "Store05" ((b) in FIG. 8), the link information of "Index02.htm" is uploaded (numeral 58 in (c) in FIG. 8). The upload of the link information may be executed at the same time of the upload of the attached files or may be executed prior to the latter. This is because these orders are not necessary to be particularly limited to which is before or after. The processes of the steps from S11 to S15 as described above realize the file transmitting unit.

Next, the transmission link program executes editing to write the link information in the written message for the electronic mail as described above (step S16). For example, a uniform resource locator (URL) address A9 shown in FIG. 16 is written in the message area A7. In addition to this, the transmission link program deletes the attached files set to the electronic mail.

When the above work is completed, the actions of the transmission link program are completed, and then the edited electronic mail in which the URL address A9 has been written in the message area A7 is transmitted (step S17). The processes of the steps of S16 and 17 realize the transmission controlling unit.

Next, the actions on the user terminal 62 that is a file transfer end and that receives the electronic mail edited and sent by the transmission link program will be explained. The user to whom the file was transferred can receive an electronic mail addressed to the user with the use of the electronic mail program of the Internet. For example, the user can access to a mail server 63 of the provider with whom the user has a contract as shown in FIG. 10. The message of the electronic mail received is displayed on a screen 64 of the user terminal 62 that is the file transfer end as shown in FIG. 16. Generally, when the URL address A9 is selected, the Web browser software is set in the standard OS so as to be activated by the electronic mail program of the Internet. By designating the file names on the screen with the Web browser software activated as described above, the user can demand the Internet server to download the files at the location shown by the URL.

An explanation is given here when the file of "Index01.htm" is downloaded. On the screen of the user terminal is displayed the view shown in FIG. 12. When "Store01" on the display is selected, the display is switched to the display shown in FIG. 13. When the file name is selected on the screen at this time, the file transfer starts. This is because one of the following items given in FIG. 15 that correspond to the data in FIG. 13 is selected:

<P><A href="ftp://www.idc.co.jp/user01/store01/AN01.txt">AN01.TXT</A><BR>
<A href="ftp://www.idc.co.jp/user01/store01/AN03.txt">AN03.TXT</A><BR>
<A href="ftp://www.idc.co.jp/user01/store01/doc01.txt">doc01.TXT</A><BR>
<A href="ftp://www.idc.co.jp/user01/store01/doc05.txt">doc05.TXT</A><BR>
<A href="ftp://www.idc.co.jp/user01/store01/pic02.jpg">pic02.jpg</A></P>

The notation, "ftp", in the above is defined as executing the download of the file designated according to the File Transfer Protocol. The user terminal 62 is set so as to activate the file transfer program when this protocol is selected.

As described, when a user operates the digital color multifunction product 1 to send an electronic mail accompanied with desired attached files to the user destination (step S5-Y), the user sends the files that were intended to be sent with the electronic mail by attaching to the predetermined location, that is, the predetermined folder of the Internet server 61 in this example (step S13), writes the information that allows downloading of the files, i.e., the URL showing the above location in this example, in the electronic mail, and sends the electronic mail without attaching the file (step S16). This allows the user to send files in a large volume to the user destination only by executing an operation of attaching desired files to the electronic mail without worrying about the data volume of the files attached to the electronic mail, resulting in an improvement of the usability of electronic mail.

When the user intends to send an electronic mail accompanied with attached files, the data volume of the files designated to be attached to the electronic mail is detected in advance (step S6). When the data volume exceeds the predetermined volume (step S7-Y), it is judged improper for the electronic mail to be sent with the attached files as they are. Only in this case, the above processes are executed automatically. Therefore, when the data volume does not exceed the predetermined volume, the user destination can download the file from the electronic mail as usually done, which provides ease of use for the user destination.

According to the present invention, when a user carries out an operation to send a prepared electronic mail accompanied with a desired attached file, the file designated as the attached file is transmitted to the predetermined location on the network, information to allow downloading the attached file on the receiver side for the electronic mail is recorded in the electronic mail, which is sent to the user destination without being accompanied with the attached file. Even though the file is in a large volume, the user only carries out the operation to attach the file to the electronic mail, which allows the user destination to obtain the file. Thus, the user can attach the file in a large volume to the electronic mail in an easy operation.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing system comprising:
   a print unit;
   a storing unit configured to store print data in the print unit;

an information processor including a file designating unit configured to designate the print data stored in the storing unit that is to be attached to an electronic mail, a link information preparation unit configured to prepare link information about a predetermined location corresponding to a specified storage area in a remote server that is connected to the image processing system via a network, said specified storage area being allocated for a receiver of the electronic mail, and upload the link information to the remote server, the link information preparation unit configured to prepare the link information prior to a file transmitting unit of the image processing system transmitting the print data to the remote server;

the file transmitting unit configured to transmit the print data to the remote server;

a mail creating unit configured to create the electronic mail that contains the link information that enables for the receiver of the electronic mail to download the print data from the predetermined location upon the file transmitting unit transmitting the print data to the predetermined location, and a mail sending unit configured to send the electronic mail created to the receiver via a network without attaching the print data; and an image processor that executes predetermined image processing to the print data, which is an image.

2. The image processing system according to claim 1, further comprising a data volume detecting unit configured to detect data volume of the print data designated by the file designating unit, wherein the file transmitting unit transmits the print data to the predetermined location upon the data volume detecting unit detecting that the data volume of the print data exceeds a predetermined value.

3. The image processing system according to claim 1, wherein the link information is a Uniform Resource Locator (URL) of the predetermined location.

4. The image processing system according to claim 1, wherein the link information preparation unit is configured to manage information related to names for a plurality of storage areas on the remote server and determine a storage area name that is available for use in preparing the link information.

* * * * *